United States Patent
Hunter

(10) Patent No.: US 6,989,866 B2
(45) Date of Patent: Jan. 24, 2006

(54) SYSTEM AND METHOD FOR INDICATING INFORMATION ON AN IMAGING DEVICE LENS STOP

(75) Inventor: Andrew Arthur Hunter, Bristol (GB)

(73) Assignee: Hewlett-Packard Development, L.P., Houston, TX (US)

( * ) Notice: Subject to any disclaimer, the term of this patent is extended or adjusted under 35 U.S.C. 154(b) by 750 days.

(21) Appl. No.: 09/794,021

(22) Filed: Feb. 28, 2001

(65) Prior Publication Data

US 2001/0033338 A1 Oct. 25, 2001

(30) Foreign Application Priority Data

Apr. 25, 2000 (EP) .......................................... 00303439

(51) Int. Cl.
H04N 5/235 (2006.01)

(52) U.S. Cl. ..................................................... 348/362
(58) Field of Classification Search ................. 396/505, 396/506, 507, 508, 509, 510; 348/362, 335
See application file for complete search history.

(56) References Cited

U.S. PATENT DOCUMENTS

| | | | |
|---|---|---|---|
| 3,905,130 A | | 9/1975 | Gordon et al. |
| 4,239,330 A | * | 12/1980 | Ashkin et al. ................. 385/22 |
| 4,253,743 A | | 3/1981 | Matsumura |
| 4,554,587 A | | 11/1985 | Ooi et al. |
| 4,920,420 A | * | 4/1990 | Sano et al. .................. 348/374 |
| 4,976,732 A | | 12/1990 | Vorosmarthy |
| 5,111,290 A | * | 5/1992 | Gutierrez ..................... 348/373 |
| 5,327,283 A | * | 7/1994 | Zobel .......................... 359/434 |
| 5,481,257 A | * | 1/1996 | Brubaker et al. ............ 348/114 |
| 5,900,923 A | * | 5/1999 | Prendergast et al. ........ 351/221 |
| 5,917,646 A | | 6/1999 | Sheridon |
| 5,953,101 A | | 9/1999 | Nordquist |
| 6,047,082 A | | 4/2000 | Rhody et al. |
| 6,433,822 B1 | * | 8/2002 | Clark et al. ................. 348/308 |

FOREIGN PATENT DOCUMENTS

| | | |
|---|---|---|
| DE | A-3620746 | 12/1987 |
| DE | A-4313031 | 10/1994 |
| EP | A-0571725 | 3/1993 |
| JP | 11-266398 | 9/1999 |

OTHER PUBLICATIONS

Wagner, R., Hunter, I.W., annd Galiana, H.L., "A Fast Robotic Eye/Head System: Eye Design and Performance," *Proceedings of the Annual International Conferenc of the IEEE Engineering in Medicine and Biology Society*, vol. 14 (pub. Oct. 29, 1992).

NIKKOR Objective, Nikon Corporation brochure XP–002148510.

* cited by examiner

*Primary Examiner*—Wendy R. Garber
*Assistant Examiner*—Jason Whipkey

(57) ABSTRACT

A camera assembly comprises a lens housing 24, an objective lens 21 mounted in the lens housing, and a stop 22 located in the lens housing. The stop 22 has a first surface 25 facing towards the objective lens 21, and this first surface is adapted to present information to a user viewing the first surface through the objective lens. The information presented is therefore visible to the user, but not exposed to wear and tear or tampering.

This arrangement is particularly useful in a camera with a digital sensor, particular a low cost digital camera with a sensor such as a CMOS sensor. Such an arrangement can advantageously be used for a camera provided as an eye of a toy.

22 Claims, 4 Drawing Sheets

SYSTEM AND METHOD FOR INDICATING INFORMATION ON AN IMAGING DEVICE LENS STOP

FIELD OF INVENTION

The invention relates to an optical assembly, particularly an optical assembly for a camera, and to methods by which such an optical assembly can be fabricated. The invention is particularly relevant for use in a small camera, or other imaging device, which uses a low cost electronic sensor.

PRIOR ART

The essential elements of a camera are a lens system to focus light on to an image plane, together with a sensor located at that image plane. Initially, this "sensor" was photoresponsive film. For many applications it is now desirable to have a sensor that has electrical signals as an output (such as charge coupled detectors (CCD)). It is particularly desirable for this sensor to have a digital output, as it is particularly easy to transfer digital data from one device or application to another, and digital data can be stored and transferred with high fidelity.

The versatility of use possible with digital sensors has been restricted, because conventional digital sensors have been relatively expensive. However, improvements in technology have now reduced the cost of such sensors. A particularly advantageous sensor type is the CMOS sensor, of which an example is described in EETimes, Oct. 12, 1998, Issue 1030. Sensors of this type can be produced to be particularly inexpensive. The existence of cheap digital optical sensors opens up new possibilities for sensor application.

The basic design of a camera system using a CMOS sensor is shown in FIG. 1. The details shown would be substantially similar if another sensor type were chosen. The elements of this camera system will now be described.

The sensor 16, mounted on a PCB substrate IS, is electrically connected to the substrate by connectors 17. The camera system may be in communication, or adapted to communicate, with other system elements through electrical connection to PCB substrate 18. The sensor 16 and substrate 18 are mounted in a sensor housing 15 (in alternative designs the PCB substrate 18 may be larger and not "within" a sensor housing in this way—provided that means are provided to ensure that unwanted light 5 does not reach the sensor). The sensor housing 15 is engaged with lens housing 4—in the arrangement shown, this engagement is adjustable (with screw thread 10) to allow for focussing. Typically, the engagement will be either fixed on assembly (possibly after a focus adjustment step during assembly), but play may be allowed for limited user adjustment depending on design.

The lens housing 4 holds a first lens 1 (typically the main objective lens), which here is held in the housing by retaining ring 19. Both housings 15, 4 and the retaining ring 19 can be conveniently produced as plastics mouldings. Additional optical elements 3 required for satisfactory imaging onto the sensor 16 are mounted within the housing. Depending on the imaging required, there may be none, one or more discrete optical elements used for this purpose in addition to the objective lens 1. Typically, such a system will also need an aperture stop 2 to limit the amount of light entering the system. Such stops are generally thin sheets of metal, coloured black. Here, both stop 2 and additional optical elements 3 are fixed within lens housing 4, but in alternative arrangements one or both of these may be adjustable—normally, however, only adjustment of size of the stop 2 is required, rather than adjustment of its position.

This camera system design is cheap and flexible, and therefore is useful for a range of different applications for which the cheap digital sensor is suited. However, it is desirable to improve further the versatility and value of this system so that it can be optimised for a range of differing applications.

STATEMENT OF INVENTION

Accordingly, the invention provides a camera assembly, comprising: an optical element at a first end of the optical assembly to receive light entering the optical assembly; and a stop, located in the optical assembly between the first optical element and the second end of the optical assembly, wherein the stop has a first surface facing towards the optical element, and wherein the first surface is adapted to present information to a user viewing the first surface through the optical element; and a sensor element to which light received through the optical element and not blocked by the stop is focussed.

The information presented to the user may relate to the nature or operation of the optical assembly, or of a device of which the optical assembly is a part, or in other embodiments may relate to the visual significance of the optical assembly with respect to other visibly associated elements. An example of this is where the optical assembly is designed to resemble an eye. This may advantageously be used as a way to locate a camera within a toy (the camera appearing as the eye of the toy). In this case, it is advantageous for the stop to resemble the iris of a human or animal eye.

One mechanical means for varying iris colour in humans is known—use of tinted contact lenses. The present invention however involves a different optical component (the stop, rather than the lens) to provide the desired visual effect—moreover, although it is known for lenses to be tinted for different purposes, the stop is also a component that is customarily provided as black (typically a matte black).

The stop may be fixed or adjustable relative to the lens housing—the stop may also be adjustable in itself (as an iris diaphragm). If fixed relative to the lens housing, the stop may be attached directly to an optical element of the assembly—preferably to the objective lens. The stop may either be bonded to such an optical element, advantageously by use of an index-matching cement, or may even be printed directly onto the optical element. The stop need not be provided for any specific technical purpose—the term "stop" in this case applies to substantially any aperturing element type that can be provided within such an optical system.

A particularly appropriate form of camera is one with a sensor which provides digital pixel output—a particularly suitable sensor for a low cost camera of this type is a CMOS sensor.

DESCRIPTION OF FIGURES

Specific embodiments of the invention will now be described, by way of example, with reference to the accompanying drawings, in which.

DESCRIPTION OF SPECIFIC EMBODIMENTS

Figure 1:
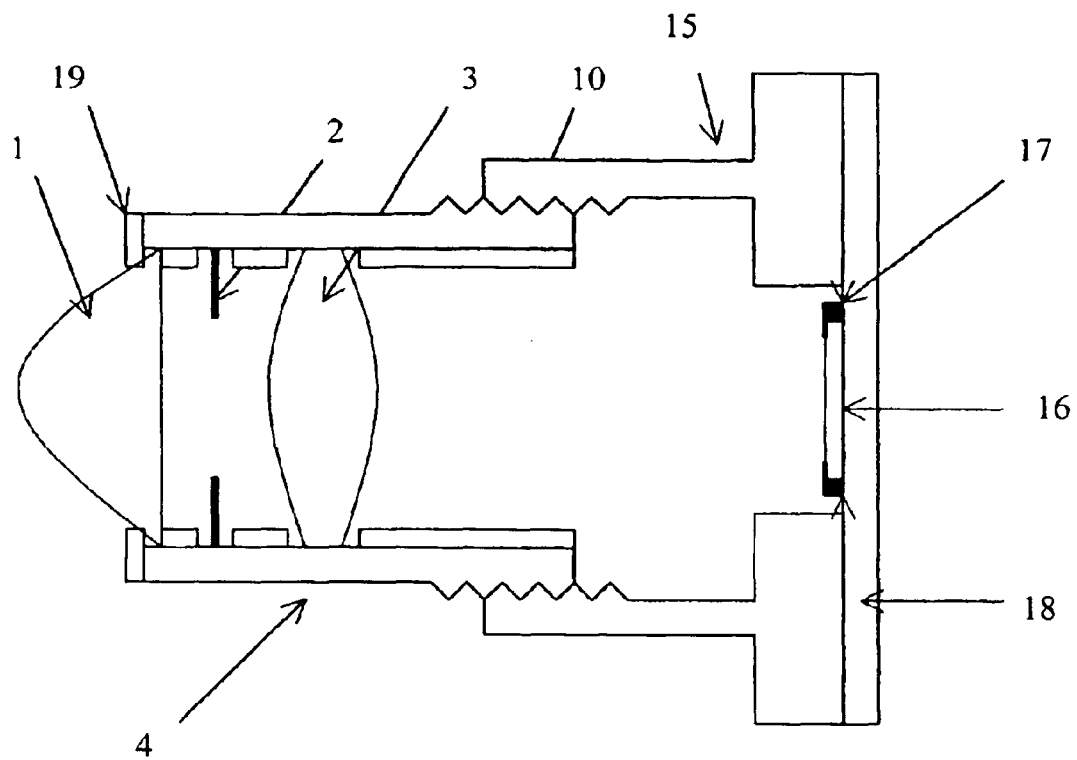
FIG. 1 shows a sectional view of a camera system adapted for use with a digital optical sensor.

Although the present invention is clearly not limited to the two-part housing of FIG. 1—it can be used in a fully integrated housing, or in an arrangement optimised for a different form of sensor (such as photographic film, or even the human eye)—the different embodiments shown can all be illustrated effectively in the context of the FIG. 1 arrangement. Specifically, the embodiments of the invention shown are provided as lens housings which can be used as alternatives or equivalents to the lens housing 4 of FIG. 1.

Figure 2A:
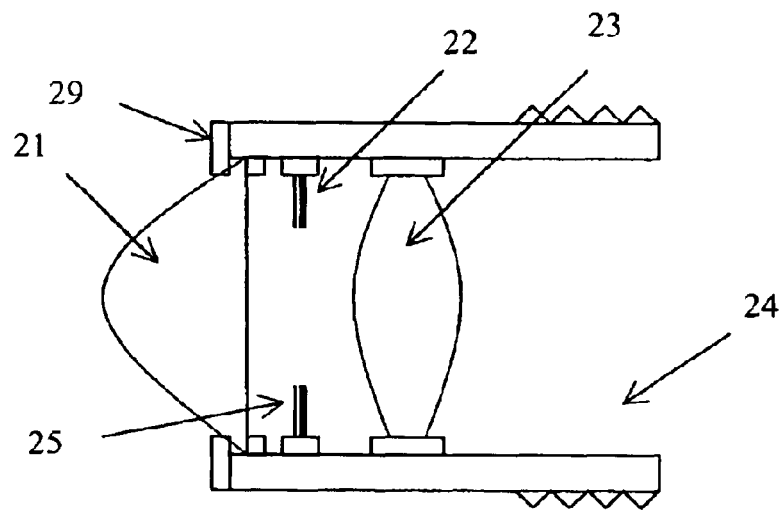
FIG. 2A shows a sectional view of a lens assembly according to a first embodiment of the invention, and adapted for use in a camera system as shown in FIG. 1.

FIG. 2A shows a first embodiment of the invention which closely resembles the lens housing 4 of FIG. 1. Lens housing 24 has fixed within it an objective lens 21 retained in place by a retaining ring 29. Also fixed (or possibly integral) within the lens housing 24 are a stop 22 and an additional optical element 23. In these aspects, lens housing 24 resembles lens housing 4 of FIG. 1. The significance of the different optical elements 21, 23 can vary depending upon the desired structure—for example, objective lens 21 may be replaced by, for example, an optical flat, in which case optical element 23 could be the main objective lens for the system.

Stop 22 differs from stop 2 of FIG. 1 in that it is not simply a black ring. As viewed to an observer from the objective lens side, stop 22 presents visual information. In this case, the information is provided by surface 25 of stop 22. Surface 25 could be provided by printing, for example—alternatively, the whole structure of stop 22 could be constructed so as to present information to the observer.

Figure 2B:
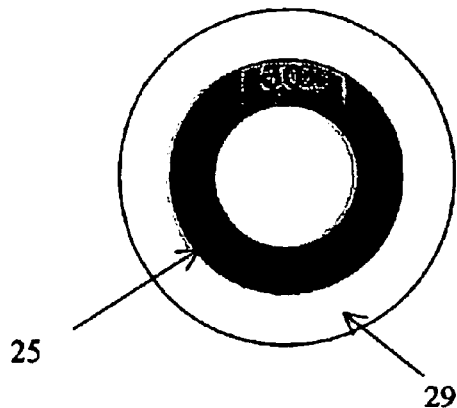
FIGS. 2B and 2C show the assembly of FIG. 2A viewed along the axis of the lens assembly, and illustrate alternative forms of stop for use in the lens assembly.
Figure 2C:
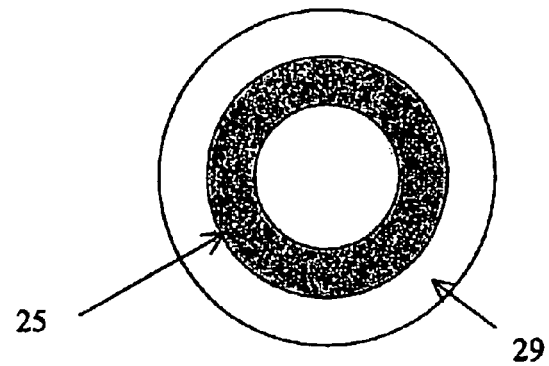

The significance of this is apparent from FIGS. 2B and 2C, which show the arrangement of FIG. 2A from the position of this observer—FIGS. 2B and 2C differ only in the information presented by surface 25.

In FIG. 2B, the information provided by surface 25 relates to the characteristics of the objective lens 21 (FIG. 2A). Conventionally, such information is typically provided on retaining ring 19 (FIG. 1) or more often on an external surface of the lens housing 4 (FIG. 1), but positioning of the information on surface 25 has certain advantages. One such advantage is that the information will be more clearly visible to the observer (especially in designs in which retaining ring 19 is narrow or is omitted altogether), as it will be magnified by the objective lens 21 and will be protected from external wear and tear. The protection from external wear and tear, and tampering, also makes this a particularly effective position to display trade mark information, product codes, and any other information needed to identify the assembly. Clearly, information presented need not relate to the objective lens 21, but could relate to the optical assembly as a whole or to any device or system of which it is a part. Information is also not limited to identification—this may also be a medium for providing instructions for use.

FIG. 2C illustrates an alternative surface 25 in which information is presented which contributes to the functional role played by the optical assembly. In this case, surface 25 is given the pattern of the iris of an eye. This is particularly appropriate if the optical assembly is intended to have the appearance of an eye, as, for example, if the assembly is part of a camera located at the eye of a child's toy (such as a teddy bear or other stuffed animal) or other entities with "vision"—an example of such a use is the NEC R100 robot, described in, for example, Electronics Weekly No. 1924, Wednesday, Sep. 8, 1999). Iris patterns are clearly not the only kind of functionally relevant information that could be provided in such arrangements—another example would be use of an appropriately coloured stop surface 25 to camouflage a camera for use in a particular environment or item.

Figure 3A:
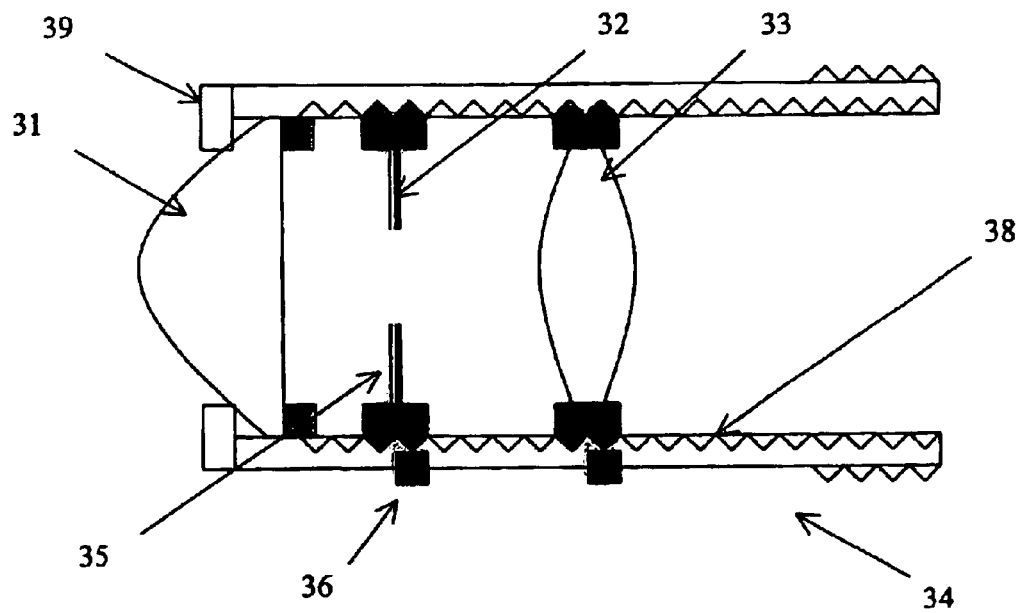
FIG. 3A shows a sectional view.

FIG. 3A shows a second embodiment of the invention, similar to that of FIG. 2A, but illustrating certain alternative features. The arrangement of FIG. 3A allows for user adjustment of particular components. The objective lens 31 is held fixed in the lens housing 34 by retaining ring 39, but the stop 32 and the additional optical component 33 are both mounted on a screw thread, and can be moved along a matching screw thread 38 within the barrel of the lens housing 34. When in appropriate positions, the stop 32 and the additional optical component 33 can be fixed in place with fixing screws 36. Typically such adjustment will only be required for factory configuration of the component. For user adjustment of such features, it is desirable to employ an easily controlled zoom function (for example, an electronically controlled zoom).

Figure 3B:
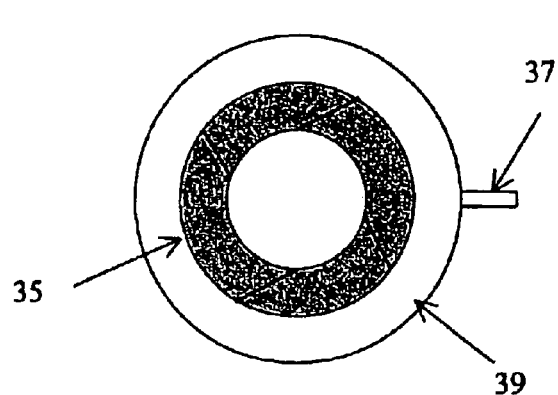
FIG. 3B show a view normal to the lens axis, of a lens assembly according to a second embodiment of the invention, and adapted for use in a camera system as shown in FIG. 1.

In this embodiment, as is shown by the view along the optical axis from the objective lens side as depicted in FIG. 3B, the possibility of adjusting the stop size is also provided. The stop 32 is provided as an iris diaphragm, adjustable manually by lever 37 (alternatively, lever 37 could be replaced by electronic control, perhaps from the controlling electronics for an associated camera sensor). In this example, the surface 35 is again patterned to resemble the iris of an eye. In use, an extremely realistic "iris" will result, as the iris diaphragm stop 32 not only resembles the iris of an eye visually but also in function.

Where stop 32 is not fixed or integral to the lens housing 34, if the disposition of the other components allows, then stop 32 can be replaced with an alternative stop with a different information surface 35 (or conceivably provided with a replacement information surface 35).

Figure 4B:
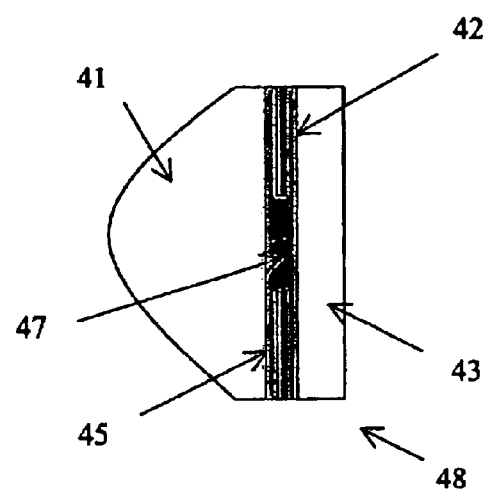
FIG. 4B shows the lens element of FIG. 4A in detail.
Figure 4A:
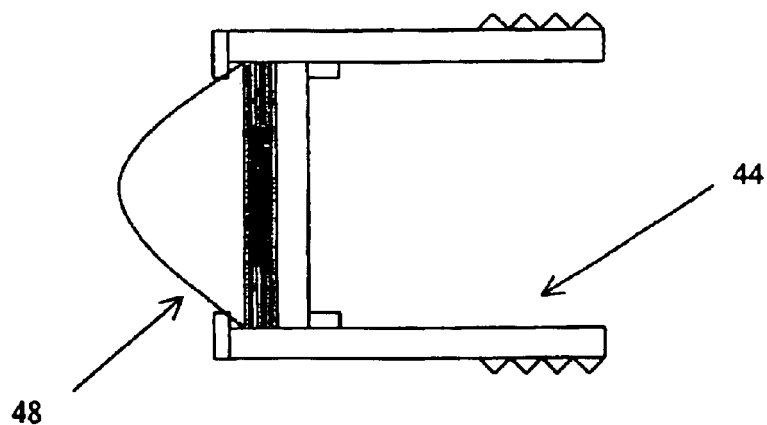
FIG. 4A shows a sectional view of a lens assembly according to a third embodiment of the invention, and adapted for use in a camera system as shown in FIG. 1.

FIG. 4A shows a third embodiment of the invention. In this case, the objective lens and the stop are fused together (with an additional optical element) in a fused lens assembly 48. Other elements of the lens housing 44 are essentially as shown in preceding embodiments. This assembly is shown in more detail in FIG. 4B.

As can be seen from FIG. 4B, the stop 42 with its information presenting surface 45 is retained between the objective lens 41 and the additional optical element 43 (here shown as a flat, though clearly alternative elements would be possible). The stop 42 is held in position by a layer of index-matching cement 47 which (together with the stop 42) fills the space between the facing optical surfaces of the objective lens 41 and the additional optical element 43.

A still further alternative is for the stop not to be an independent element, but instead formed upon or in association with one of the other elements in the system. It would be possible to form the stop in this way upon an additional optical element as shown in the preceding embodiments, but a particularly effective solution is to form the stop upon the rear side of the objective lens itself. Such an arrangement is shown in FIG. 5A.

Figure 5A:
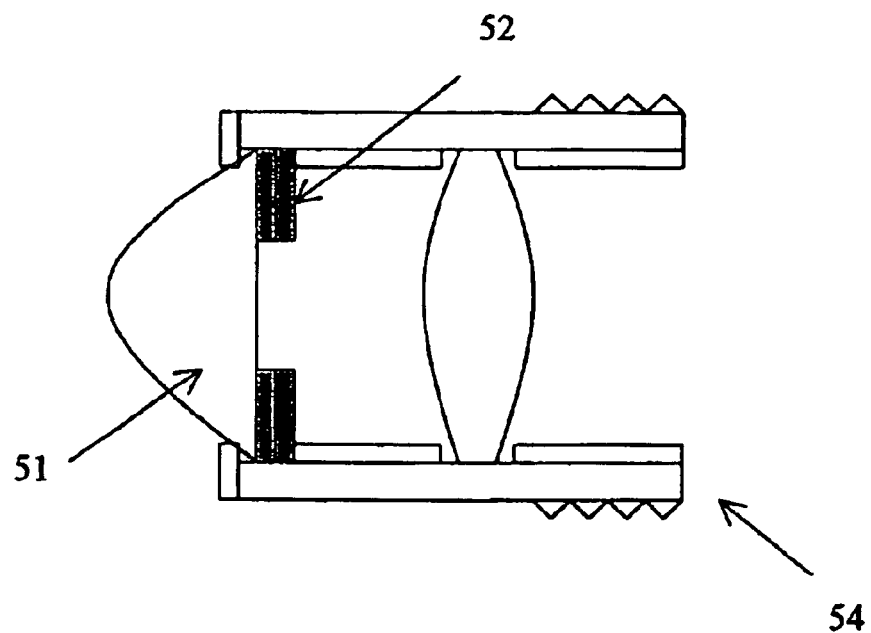
FIG. 5A shows a sectional view of a lens assembly according to a fourth embodiment of the invention, and adapted for use in a camera system as shown in FIG. 1.

The arrangement of FIG. 5A resembles that shown in the first and second embodiments, but differs in the construction of the objective lens 51 and the stop 52. The stop 52 here is formed on the rear (internal to the lens housing 54) face of the objective lens 51.

Figure 5B:
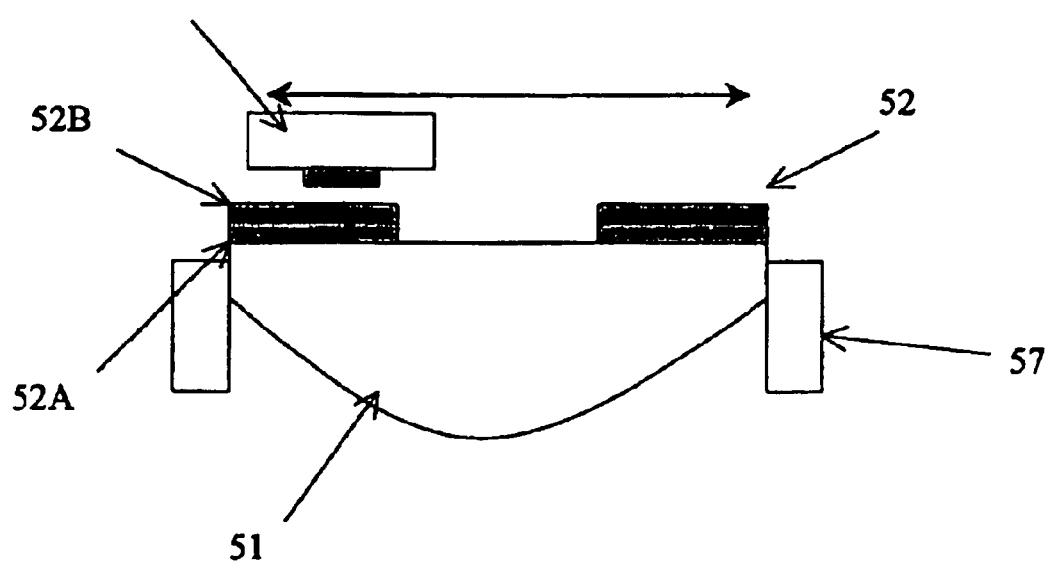
FIG. 5B shows the lens element of FIG. 5A in detail in the process of fabrication.

The stop 52 can be formed on the objective lens 51 by essentially any appropriate means. This approach can be used to reduce the overall cost and complexity of the system, as one fewer physically distinct component is used than where a separate stop is provided. There is, however, an extra fabrication step for the objective lens. A particularly appropriate method of forming the stop 52 is by printing onto the objective lens 51. FIG. 5B shows the panting of stop 52 by layers 52A, 52B onto the rear surface of the objective lens 51 by means of a print head 58. These layers could be, for example, different patterns, different colour layers, or materials adapted to promote layer adhesion, for other pigmentation purposes, or for lightproofing. The objective lens 51 is held in position by a chuck 57 while the print head 58 reciprocates.

In the FIG. 5B arrangement, the stop 52 is printed only on a part of the objective lens 51—this is appropriate if the objective lens 51 is already finished. An alternative approach which may be used to give higher lens quality is to leave at least a final grinding step in the fabrication of the lens until after the stop 52 has been deposited. If this is done, the stop 52 may be deposited over all the rear surface of the objective lens 51, and then ground away over an optical part of the surface.

It will be understood by the skilled man that there a wide array of well known printing and other processes by which the stop 52 may be provided with appropriate information for presentation to the user.

As can be seen from the different embodiments described, the invention can be used to enhance the function of an optical assembly or to provide useful or necessary information about the assembly itself (or a system of which it is a part). It will be appreciated that the person skilled in the art could devise further embodiments of the invention for these or other purposes using the principles described above.

What is claimed is:

1. A camera assembly, comprising:
   an optical element at a first end of an optical assembly to receive light entering the optical assembly;
   a stop, located in the optical assembly between the optical element and a second end of the optical assembly, wherein the stop has a first surface facing towards the optical element, and wherein the first surface is adapted to present information to a user viewing the first surface through the optical element; and
   a sensor element to which light received through the optical element and not blocked by the stop is focussed.

2. A camera assembly as claimed in claim 1, wherein the camera assembly further comprises a lens housing, wherein the optical element and the stop are located within the lens housing.

3. A camera assembly as claimed in claim 1, wherein the optical element is an objective lens.

4. A camera assembly as claimed in claim 1, wherein the information presented to the user relates to the nature or operation of the camera assembly, or of a device of which the camera assembly is a part.

5. A camera assembly as claimed in claim 1, wherein the camera assembly is adapted to be mounted in another object, and wherein the information presented to the user relates to the appearance of the another object.

6. A camera assembly as claimed in claim 5, wherein the visual significance of the camera assembly is as an eye.

7. A camera assembly as claimed in claim 6, wherein the camera assembly is adapted for use as the eye of a toy.

8. A camera assembly as claimed in claim 1, wherein the camera assembly comprises one or more additional optical components.

9. A camera assembly as claimed in claim 1, wherein the stop is an iris diaphragm.

10. A camera assembly as claimed in claim 1, wherein the stop is fixed to an optical element located in a lens housing.

11. A camera assembly as claimed in claim 10, wherein the optical element is an objective lens.

12. A camera assembly as claimed in claim 10, wherein the stop is fixed to the optical element by index matching cement.

13. A camera assembly as claimed in claim 10, wherein the stop is affixed to the optical element.

14. A camera assembly as claimed in claim 1, wherein the sensor element is an optical detector which provides digital pixel values as an output.

15. A camera assembly as claimed in claim 14, wherein the sensor element is a CMOS sensor.

16. A camera assembly as claimed in claim 1, wherein the information presented to the user is printed information.

17. A method of indicating information to a user of a camera, comprising displaying the information on a stop, the stop located in an optical assembly behind an external surface of the optical assembly, wherein the stop has a first surface facing towards the external surface of the optical assembly, and wherein the first surface is adapted to present the information to a user viewing the first surface through the external surface of the optical assembly.

18. The method of claim 17, further comprising displaying printed information on the stop.

19. The method of claim 18, further comprising displaying printed instructions on the stop describing use of the camera.

20. The method of claim 17, further comprising displaying printed information on the stop describing characteristics of the camera.

21. The method of claim 17, further comprising displaying a surface patterned to resemble the iris of an eye.

22. A system of indicating information to a user of a camera, comprising means for displaying the information on a stop, the stop located in an optical assembly behind an external surface of the optical assembly, wherein the stop has a first surface facing towards the external surface of the optical assembly, and wherein the first surface is adapted to present the means for displaying the information to a user viewing the first surface through the external surface of the optical assembly.

* * * * *